United States Patent

Saari

[11] 4,105,505
[45] Aug. 8, 1978

[54] FLASH EVAPORATORS

[76] Inventor: Risto Saari, Harjula, 02440 Luoma, Finland

[21] Appl. No.: 699,936

[22] Filed: Jun. 25, 1976

[51] Int. Cl.$^2$ .......................... B01D 1/26; B01D 3/06
[52] U.S. Cl. ................................. 202/173; 202/180; 202/197; 159/2 MS; 203/11
[58] Field of Search ..................... 203/10, 11, 71, 73, 203/80, DIG. 17; 202/173, 180, 197; 159/2 MS

[56] References Cited

U.S. PATENT DOCUMENTS

| | | | |
|---|---|---|---|
| 3,161,558 | 12/1964 | Pavelic et al. | 202/173 |
| 3,192,132 | 6/1965 | Loebel | 202/73 |
| 3,197,387 | 7/1965 | Lawrence | 202/173 |
| 3,214,350 | 10/1965 | Lichtenstein | 202/173 |
| 3,326,280 | 6/1967 | Bosquain et al. | 202/173 |
| 3,580,816 | 5/1971 | Tidball et al. | 202/173 |
| 3,856,630 | 12/1974 | Gilbert | 202/173 |
| 3,879,265 | 4/1975 | Margen | 202/173 |

Primary Examiner—Wilbur L. Bascomb, Jr.
Attorney, Agent, or Firm—Steinberg & Blake

[57] ABSTRACT

A flash evaporator to be used for purposes such as distilling sea water has a series of evaporator stages in which vapor derived from liquid flowing through the successive evaporator stages is condensed to form a distillate. A wall structure situated in each evaporated stage defines therein an elongated narrow gap the length of which is substantially greater than the width of each evaporator stage with this gap forming an orifice through which the liquid is compelled to issue while flowing from an inlet to an outlet of each evaporator stage. Between the inlet and the gap in each evaporator stage the wall structure defines an upstream flow path the cross section of which decreases from the inlet toward the gap. From the gap toward the outlet of each stage the wall structure defines a downstream flow path the cross section of which increases from the gap toward the outlet. Each evaporator stage has an interior space communicating with the liquid flowing along the downstream flow path to receive vapor therefrom, and in this space is situated a condenser for condensing the vapor, this condenser being situated at an elevation lower than the free surface of the liquid flowing along the downstream flow path. The vapor flowing toward the condenser in each stage is directed centrifugally against the inner surface of an outer shell of each stage so that any liquid droplets entrained with the vapor deposit themselves against the inner surface of the shell, and troughs are carried by the inner surface of the shell to collect the droplets so that the latter cannot travel with the vapor to the condenser.

10 Claims, 8 Drawing Figures

FLASH EVAPORATORS

BACKGROUND OF THE INVENTION

The present invention relates to evaporators and in particular to so-called flash evaporators to be utilized for purposes such as distilling sea water.

The present invention relates especially to evaporators which operate with relatively high liquid flow rates at relatively low temperatures.

In conventional flash evaporators utilized for purposes such as distilling sea water, the liquid which is to be distilled flows from one distilling stage to the next with the successive stages operating at progressively lower pressures, and the liquid in each stage flows through an orifice so that part of the liquid evaporates, drawing the energy required for this purpose from the remaining liquid which thus is correspondingly cooled.

The operation of installations of this type require that the temperature of the fluid should have an equilibrium with the prevailing vapor temperature, so that the energy content of the liquid can be utilized as fully as possible. In practice, however, such equilibrium is not fully achieved. This equilibrium state is dependent upon a number of factors including the prevailing temperature, the differential temperature from one stage to the next, the design of the orifice through which the liquid flows in each stage, the length of each stage, and the quantity of liquid flowing therethrough. This latter factor, namely the quantity of liquid flowing through each stage, plays a highly significant role particularly at low temperatures and when the interstage differential pressure is low. In addition, this factor of the quantity of liquid flowing through each stage becomes very important when the liquids which are distilled have a high viscosity, as, for example, when industrial waste waters are being concentrated. Under the latter circumstances, a major liquid flow requires the discharge of a thick liquid layer through the orifice in each distilling stage. Inasmuch as the vapor pressure of the liquid is only slightly higher than the prevailing pressure, only the uppermost layer of the liquid is capable of evaporating satisfactorily, while boiling of the liquid at a greater depth is prevented by reason of the hydrostatic head of the liquid. As a result, the above equilibrium conditions cannot be achieved, and part of the liquid passes through each distilling state at an excessively high temperature.

In attempting to distill water by utilizing the waste heat contained therein while at the same time providing extremely low pressures, teachings as disclosed in U.S. Pat. Nos. 3,630,854 or 3,783,108 may be utilized for achieving the low pressure by situating the evaporator at a barometric height over the free water surface. However, if a conventional evaporator structure is used under such conditions, with the condenser situated at an upper part of the evaporator, the cooling water required for the condenser must be pumped up to an excessive height, losing in this way a certain amount of pumping energy and creating difficulties with respect to air dissolved in the cooling water and separating therefrom in the condenser tubes.

Futhermore, at relatively low temperatures, the vapor has a very high specific volume. This factor creates the need of wide vapor passages in the evaporator or high vapor velocities. When high vapor velocities are utilized there is a well known risk that droplets of liquid are entrained with the vapor and will therefore deteriorate the quality of the distillate. In order to avoid this problem it has been common to use various types of screen or net-like droplet separators. When operating at low temperatures with exceedingly low differential temperatures between the successive stages, such droplet separators create undesirably high pressure losses which in turn increase the required heat-exchange surface area and the cost of the installation.

SUMMARY OF THE INVENTION

It is accordingly a primary object of the present invention to provide a flash evaporator which will avoid the above drawbacks.

In particular, it is an object of the present invention to provide the several stages of an evaporator each with an elongated narrow orifice through which it is possible to discharge in each evaporator stage a liquid layer the thickness of which is reduced to an extent considerably beyond the thickness of the layer of liquid discharging through an orifice of a conventional evaporator.

In addition, it is an object of the present invention to provide for each stage of a flash evaporator a flow path upstream of the orifice in each stage which reduces the cross section of the flowing liquid approaching each orifice and a flow path downstream of the orifice in each stage in which the cross section of flow increases as the liquid in each stage flows beyond the orifice of each stage.

Furthermore, it is an object of the present invention to provide an evaporator wherein the condenser can conveniently be situated at such a low elevation that part of the pumping energy required in a conventional evaporator to pump the cooling liquid through the evaporator coils at an upper part of the evaporator can be saved while at the same time difficulties in connection with separation of air from the coolant in the condenser tubes are avoided.

Yet another object of the present invention is to provide an evaporator construction which reliably prevents droplets of liquid from being entrained with the vapor traveling to the condenser while at the same time avoiding the drawbacks encountered in conventional evaporators with screen or net-like droplet separators.

The objects of the present invention also include an evaporator having a construction according to which it is possible to promote an effective liquid flow through the successive orifices of the successive stages and an effective evaporation of the liquid in the successive stages even when operating at low pressures and with a small interstage differential temperature, with a minimal interstage differential pressure on the order of only a few centimeters of water column.

The evaporator of the invention includes an elongated, liquid-conveying shell means having a substantially horizontal attitude and having a hollow interior for conveying a liquid in a given direction along the hollow interior of this shell means. A plurality of transverse partition means are distributed longitudinally along the shell means and are fixed thereto while extending transversely thereacross for dividing the shell means into a plurality of evaporator stages arranged one after the other in the direction in which liquid is conveyed by the shell means in the hollow interior thereof. Each of these partition means is formed with an opening situated at the interior of the shell means, and each opening defines an outlet for one stage and an inlet for the next stage, so that each pair of successive partition means define between themselves an evaporator stage having an inlet at an upstream partition means and an outlet at a downstream partition means. In each evaporator stage there is a wall means extending between the upstream and downstream partition means thereof, this wall means having in each evaporator stage a pair of wall portions spaced from each other and defining between themselves an elongated narrow gap the length of which is substantially greater than the width of the shell means with this gap defining an orifice through which the liquid is compelled to flow while travelling from the inlet to the outlet of each stage. This wall means defines with the shell means from the inlet to the gap in each stage an upstream liquid flow path through which liquid is compelled to flow from the inlet to the gap, and the wall means provides for the upstream flow path a cross section which decreases as the liquid flows along the upstream flow path in each stage. The wall means defines between the gap and the outlet of each stage a downstream flow path extending from the gap to the outlet of each stage, and the wall means provides for the downstream flow path in each stage a cross section which increases as the liquid flows along the downstream flow path in each stage from the gap to the outlet of each stage. Each of the evaporator stages has in its interior a space which communicates with the downstream flow path for receiving a vapor in each stage downstream of the gap. A condenser means is situated in each evaporator stage in the latter space thereof for condensing the vapor. A collector means is situated beneath the condenser means in each stage for collecting distillate resulting from the condensation of the vapor by the condenser means.

BRIEF DESCRIPTION OF DRAWINGS

The invention is illustrated by way of example in the accompanying drawings which form part of this application and in which.

DESCRIPTION OF PREFERRED EMBODIMENTS

Figure 1:
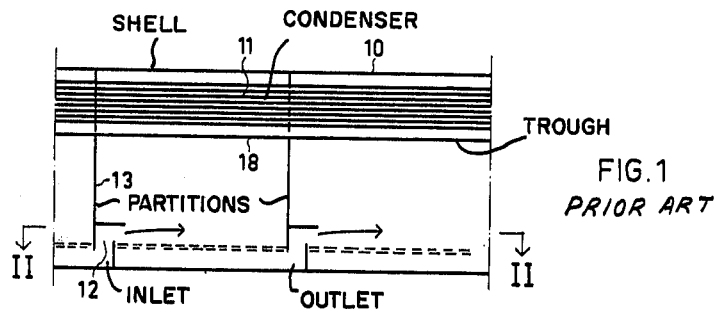
FIG. 1 is a fragmentary longitudinal schematic sectional elevation of a prior art evaporator.
Figure 2:
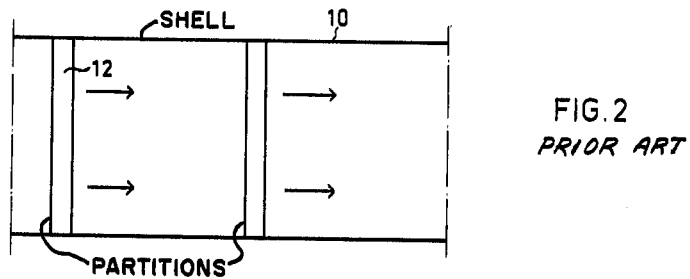
FIG. 2 is a schematic sectional plan of the structure of FIG. 1 taken along line II—II of FIG. 1 in the direction of the arrows.

Referring first to FIGS. 1 and 2, there is schematically illustrated therein a conventional evaporator having a series of evaporator stages in which the liquid flows from the left toward the right from one stage to the next, as viewed in FIGS. 1 and 2. The evaporator includes an outer tubular shell 10 carrying in its interior at an upper region thereof a condenser means 11. A plurality of partition means 13 extend transversely across the interior of the shell 10 while being fixed thereto so as to define therein a series of evaporator stages separated one from the next by the plurality of partition means 13. Each partition means 13 has a lower edge spaced above the bottom wall portion of the shell 10 so as to define therewith an inlet into one stage and an outlet from the preceding stage. At a slight distance downstream of each partition 13 a relatively short vertical wall extends upwardly from the bottom of the shell 10 while a horizontal wall is fixed to the downstream side of each partition 13 and extends over the top edge of the relatively short wall, so that in this way there is provided just beyond the lower edge of each partition means 13 an orifice structure 12 extending across the interior of the shell 10, as is apparent from FIG. 2. Thus, just after the liquid enters each evaporator stage when flowing beyond the bottom edge of each partition means 13, the liquid flows through the transverse orifice 12. The vapor which rises in each stage reaches the condenser means 11 to be condensed thereby, with the distillate accumulating in the trough 18 which is situated beneath the condenser means 11 as schematically shown in FIG. 1.

Figure 3:
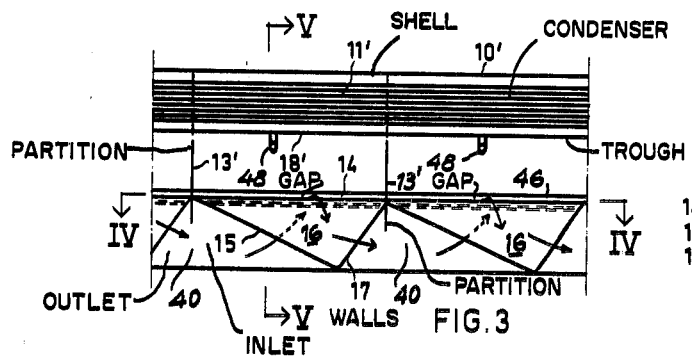
FIG. 3 is a schematic fragmentary longitudinal sectional elevation of one possible embodiment of an evaporator according to the invention.
Figure 5:
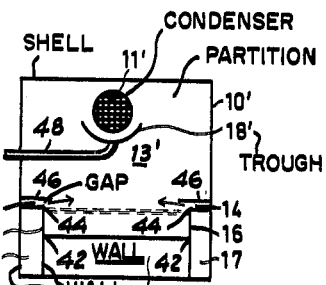
FIG. 5 is a transverse schematic elevation of the structure of FIG. 3 taken along V—V of FIG. 3 in the direction of the arrows.
Figure 4:
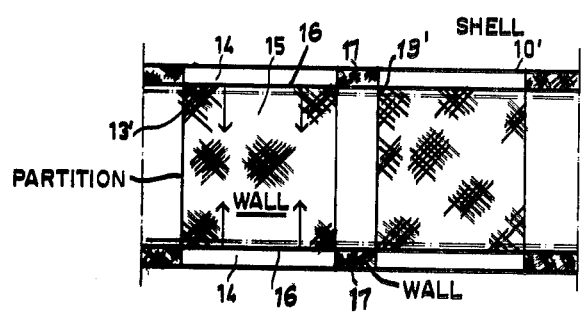
FIG. 4 is a sectional plan view of the structure of FIG. 3 taken along line IV—IV of FIG. 3 in the direction of the arrows.

This conventional prior art structure of FIGS. 1 and 2 has the problems referred to above. In order to avoid these problems the structure of the present invention is provided. The embodiment of the invention which is illustrated in FIGS. 3—5 is particularly effective with respect to improving the evaporation of the liquid. The embodiment of FIGS. 6 and 7 in addition achieves advantages with respect to saving energy in pumping liquid to the condenser coils as well as with respect to avoiding entraining of droplets with the vapor which reaches the condenser. The embodiment of FIG. 8 provides a particularly effective promotion of liquid flow through the orifices as well as an effective evaporation of the liquid under conditions where the operation takes place at low pressures with small interstage differential temperatures, with the interstage differential pressure being minimal, which is to say only on the order of a few centimeters of water column.

Referring now to FIGS. 3-5, it will be seen that this embodiment of the invention includes a shell means 10' which has the illustrated substantially horizontal attitude and which is of a generally square cross section, as illustrated in FIG. 5. A plurality of partition means 13' are fixed to the shell 10' in the interior thereof and are distributed longitudinally therealong, the shell means 10' serving to convey the liquid from the left toward the right, as viewed in FIGS. 3 and 4, along the interior lower portion of the shell means 10. The several partition means 13' which divide the interior of the shell means 10' into the successive evaporator stages are formed at their lower regions with openings 40 each forming an inlet into one stage and an outlet into the next stage. The opening 40 in each partition means 13' may simply take the form of situating the lower edge of each partition means 13' at an elevation higher than the lower wall portion of the shell means 10'.

Thus, each pair of successive partition means 13' define between themselves an evaporator stage, and situated in each evaporator stage is a wall means having spaced wall portions defining between themselves a pair of elongated narrow gaps 14 which serve as orifices through which the liquid must flow when traveling from the inlet toward the outlet of each stage.

This wall means includes in each stage an inclined transverse wall 15 which at its end adjacent the inlet of each stage has an elevation higher than at its end adjacent the outlet of each stage. The transverse wall 15 of each stage is fixed at its upper left edge to the downstream surface of the upstream partition means 13' of each stage, while the wall 15 is fixed at its lower right edge, as viewed in FIG. 3, to the bottom wall of the shell means 10'. The inclined wall 15 of the wall means of each stage has a pair of opposed side edges 42 which are spaced inwardly from the opposed side wall portions of the shell means 10'. The wall means includes a pair of upright walls 16 which are fixed to the opposed side edges 42 of the inclined wall 15 and which extend upwardly therefrom, these upright walls 16 terminating in upper edges 44 which define the lower edges of the orifices or gaps 14 through which the liquid must flow when traveling from the inlet to the outlet of each stage.

The wall means further includes a pair of horizontal elongated walls 46 fixed to the opposed side walls of the shell means 10 and extending inwardly therefrom over the top edges 44 of the upright walls 16, so that the horizontal walls 46 define with the upright walls 16 the gaps or orifices 14 both of which extend longitudinally along the shell means 10' from the upstream to the downstream partition means 13 of each stage. As is apparent particularly from FIG. 3, each upright wall 16 is of a triangular configuration and has a downstream edge inclined upwardly from the lower edge of the inclined wall 15 and engaging at its upper end the upstream surface of the downstream partition means 13' of each stage. A pair of end walls 17 are respectively fixed to the downstream edges of the upright walls 16 and extend therefrom outwardly into engagement with the inner surfaces of the opposed side walls of the shell means 10'.

It will be seen, therefore, that with this construction as the liquid enters through the inlet 40 into a given evaporator stage, the liquid is situated between the lower surface of the inclined wall 15 and the lower wall portion of the shell means 10' so that as the liquid approaches the gaps 14 the wall means of the invention provides for the liquid a cross section of flow which decreases. The liquid which flows along the lower surface of the inclined wall 15 can travel from the latter upwardly along the outer side surfaces of the upright walls 16 and along the upstream surfaces of the end walls 17, so that the liquid in this way must travel up through the relatively narrow spaces defined between the upright walls 16 and the outer side wall portions of the shell 10' in order to reach the elongated gaps 14. As is particularly apparent from FIG. 5, the pair of gaps 14 face each other while extending longitudinally of the shell means 10', so that the liquid necessarily issues through the pair of gaps 14 in opposed directions transversely of the shell means 10'. In this way an exceedingly effective issue of the liquid through the gaps or orifices 14 is achieved providing an extremely thin liquid layer issuing through the gaps while at the same time achieving for the layer which issues through the gaps 14 a relatively large area so that a considerable amount of liquid can issue in the form of an extremely thin layer through the pair of opposed orifices 14.

After issuing through the orifices 14, the liquid is free to fall onto the upper surface of the inclined wall 15, with the liquid being confined at this upper surface between the pair of upright walls 16 while flowing downwardly toward the outlet of each stage. In this way it will be noted that beyond the gaps 14 the wall means of the invention provides for the liquid a downstream flow path the cross section of which increases toward the outlet of each stage. Thus while the upstream flow path in each stage, situated upstream of the gaps 14, has a cross section which diminishes from the inlet toward the gaps 14, the cross section of the downstream flow path increases.

The shell means 10' provides in each of the evaporator stages a free space which communicates with the upper surface of the liquid flowing along the downstream flow path beyond the gaps 14, and the condenser means 11' is situated in this free space so that the vapor can have ready access to the condenser means 11'. The vapor which condenses at the condenser means 11' is collected in a trough 18' communicating at each stage with a suitable outlet 48 through which the distillate can be withdrawn from the trough 18'.

As a result of providing the above upstream and downstream flow paths toward and away from the gaps in each stage which respectively narrow and widen, it is possible to provide for the flowing liquid an average flow velocity which is approximately constant. Thus, it will be seen that each downstream flow path feeds liquid to the upstream flow path of the next stage.

It will be noted that with the construction of FIGS. 3-5, inasmuch as the horizontal cross sectional area of each evaporator stage is approximately of a square-shaped configuration, it is possible by situating the pair of orifices 14 longitudinally along the opposite sides of each stage to achieve an orifice length which is twice as long as the length which is possible with a conventional embodiment as illustrated in FIGS. 1 and 2 above. Of course, the pair of orifices need not be arranged as illustrated. While they may be parallel, they also can have non-parallel positions with respect to each other, and they can cross each other, or have any arbitrary direction depending upon the particular shape of the evaporator and the components thereof. It is however possible with this construction to control the thickness of the liquid discharging through the orifice within wide limits.

Figure 6:
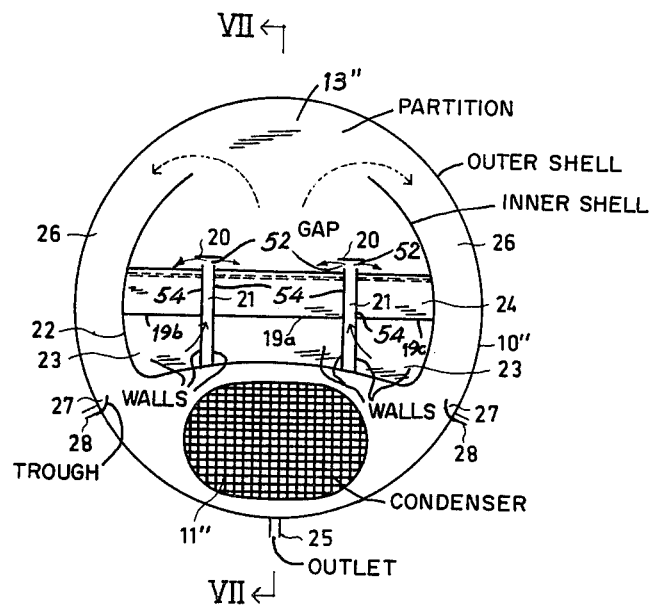
FIG. 6 is a schematic transverse sectional elevation of a further embodiment of an evaporator according to the invention, taken along line VI—VI of FIG. 7 in the direction of the arrows.
Figure 7:
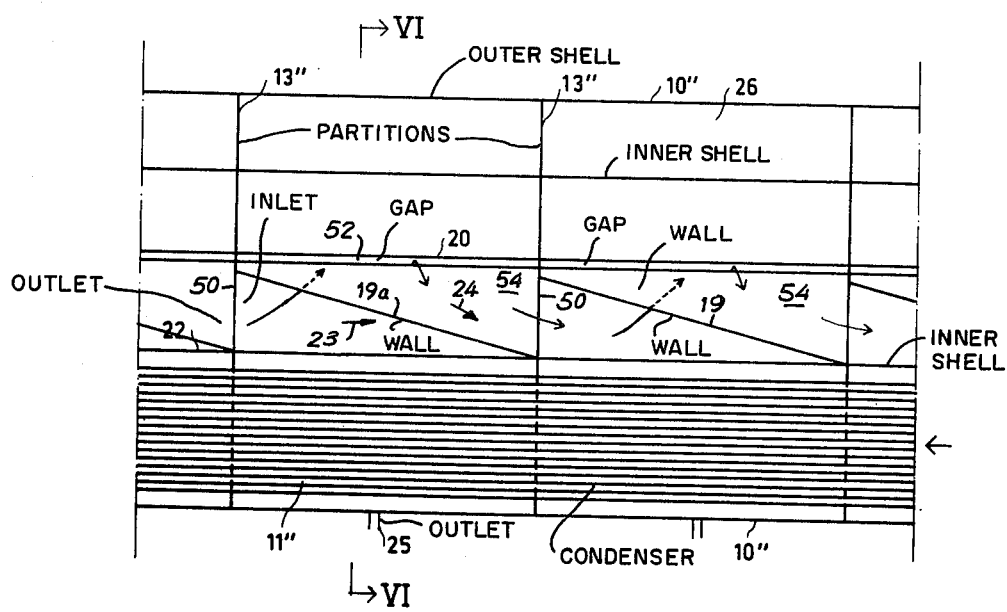
FIG. 7 is a schematic fragmentary longitudinal sectional elevation of the evaporator of FIG. 6 taken along line VII—VII of FIG. 6 in the direction of the arrows.
Figure 8:
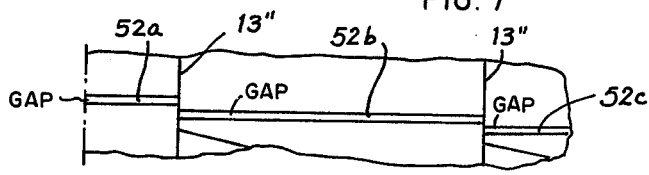
FIG. 8 is a schematic fragmentary longitudinal sectional elevation of a further embodiment of an evaporator according to the invention.

In the embodiment of the invention which is illustrated in FIGS. 6 and 7, the evaporator includes an outer shell means 10" which is of a circular cross section, as illustrated in FIG. 6. An inner shell means 22 which has an open top extends longitudinally along the interior of the outer shell means 10", and it is this inner shell means 22 which serves to convey the liquid from the left toward the right, as viewed in FIG. 7, from one evaporator stage to the next. A plurality of partition means 13" are fixed to the interior of the outer shell means 10" extending completely across the interior thereof and thus also across the inner shell means 22, for dividing the evaporator into the successive stages. At the interior lower portion of the inner shell means 22, each partition means 13" is formed with an opening 50 which defines the inlet into one stage and the outlet from one stage into the next stage. This embodiment also has a wall means extending between the upstream and downstream partition means 13" of each stage for defining therein by way of spaced wall portions of the wall means the elongated gaps or orifices 52 through which the liquid is compelled to flow while traveling from the inlet to the outlet of each stage. The wall means includes in this embodiment also an inclined wall structure having at its end adjacent the inlet of each stage an elevation higher than at its end adjacent the outlet of each stage. In this embodiment the inclined wall includes three wall portions 19a, 19b, and 19c. Thus it will be seen that the inclined wall 19a is situated between and spaced from the inclined walls 19b and 19c, with all of these walls being situated in a common plane which is inclined downwardly from the inlet toward the outlet as illustrated in FIG. 7. The walls 19b and 19c are fixed to and extend inwardly from opposed inner side surfaces of the inner shell means 22, and all of these walls 19a–19c are fixed at their upstream ends to the upstream partition means 13' and at their downstream ends to the lower wall portion of the inner shell means 22 at the lower edge of the outlet 50 of each stage. The several inclined walls 19a–19c terminate inwardly of the opposed side walls of the shell 22 in free edges which are parallel to each other and which are all fixed to upright walls 54 of the wall means. Thus it will be seen that as a result of this construction these are four upright walls 54, and all of these upright walls terminate in upper edges which define the lower edges of the several gaps or orifices 52. Situated over these upper edges of the upright walls 54 while spaced therefrom are a pair of horizontal walls 20 each extending between and being fixed to the upstream and downstream partition means 13" of each stage.

Thus, with the embodiment of FIGS. 6 and 7, the lower surface of the inclined wall 19a–19c defines with the bottom wall portion of the inner shell means 22 a part of an upstream flow path 23 which is of a smaller cross-sectional area adjacent the gaps or orifices 52 than adjacent the inlet 50. Thus when flowing along the upstream flow path 23 the liquid will be confined between the downwardly inclined lower surfaces of the walls 19a–19c and the bottom wall portion of the shell means 22, and this liquid is compelled to flow upwardly through the narrow spaces 21 defined between the adjoining pairs of upright walls 54 extending upwardly from the inner side edges of the walls 19a–19c, as illustrated in FIG. 6. When reaching the top of the passages 21 defined between the pairs of upright walls 54, the liquid is compelled to flow along the lower surfaces of the horizontal walls 20 out through the gaps 52 each of which extends longitudinally between the upstream and downstream partition means 13" of each stage. It will be noted that at the central inclined wall 19a the liquid tissues in a pair of opposed directions transversely of the inner shell means 22 toward each other, while at the walls 19b and 19c, the liquid issues through the gaps 52 in opposed directions transversely of the inner shell means 22 away from each other.

After passing through the several gaps 52 the liquid is free to fall on the upper surfaces of the inclined walls 19a–19c, flowing downwardly along these upper surfaces while confined between the pair of upright walls 54 fixed to the opposed side edges of the central wall 19a and between the other pair of upright walls 54 and the opposed inner side surfaces of the shell means 22. Thus at this time the liquid will flow beyond the gaps 52 along the downstream flow path 24 which has a cross section which increases as the liquid travels from the gaps 52 to the outlet 50 of each stage.

It is apparent, therefore, that the embodiment of FIGS. 6 and 7 achieves all of the advantages set forth above in connection with the embodiment of FIGS. 3–5. However, the embodiment of FIGS. 6 and 7 is also capable of achieving additional advantages. It will be seen that with this embodiment the vapor rises upwardly through the open top of the inner shell means 22. The condenser means 11" of this embodiment is situated in the outer shell means 10" beneath the inner shell means 22. Thus, in order to reach the condenser means 11", the vapor must flow around the exterior of the inner shell means 22 through the passages 26 shown in FIG. 6 along the concave inner opposed side surfaces of the outer shell means 10". As a result of the centrifugal force resulting from this path of the vapor flowing toward the condenser means 11", any droplets of liquid entrained in the vapor necessarily deposit themselves against the inner concave surfaces of the shell means 10" at the passages 26, and these droplets are readily collected in a pair of longitudinally extending troughs 27 fixed to the inner opposed side surface portions of the outer shell means 10" at the elevation illustrated in FIG. 6 which is slightly below the elevation of the inner shell means 22. The collected droplets can be discharged out of the troughs 27 through the outlets 28 shown schematically in FIG. 6. Thus, it is possible with the embodiment of FIG. 6 and 7 to prevent in a reliable manner any droplets from reaching the condenser means 11", while avoiding the drawbacks encountered with conventional screens or the like which are provided for this purpose. Moreover, since the condenser means 11" is situated at the low elevation shown in FIG. 6 and 7, beneath the inner shell means 22, the energy which otherwise would be required to pump the cooling water to the condenser coils at an elevation situated at an upper part of the shell means is saved, and at the same time problems in connection with air dissolved in the cooling liquid are avoided.

With the embodiment of FIGS. 6 and 7, it is the lower wall portion of the outer shell means 10" which forms the collector means for collecting the distillate resulting from condensing of the vapor by the condenser means 11". The several stages are provided respectively with outlets 25 through which the distillate can be discharged.

It is to be noted that separation of droplets which may be entrained with the vapor is reliably achieved with the embodiment of FIG. 6 and 7 due to the comparatively high velocity of the vapor which creates a centrifugal force sufficient to cause the droplets to deposit themselves against the inner surface of the outer shell means 10". Thus it is only a pure vapor which reaches the condenser means 11". Also with the embodiment of FIGS. 6 and 7, as pointed out above, there is no necessity for pumping the cooling liquid for the condenser means to an unnecessary height at the upper portion of the shell means, and there is no need uselessly to separate air dissolved in the cooling liquid due to the vacuum which is produced.

According to a further feature of the invention which is schematically illustrated in FIG. 8, the several nozzles or gaps 52a, 52b, 52c, of the successive stages are situated at successively lower elevations so that the gaps or orifices of each stage except the first are situated at an elevation lower than the gaps or orifices of the preceding stage. Of course it is also possible to incorporate this feature into the embodiment of FIGS. 3–5 by situating the successive gaps or orifices 14 of the successive stages at successively lower elevations. As a result of this feature, when operating at low pressures and with small interstage differential temperatures, the interstage differential pressure is minimal, being only on the order of a few centimeters of water column. It is possible in this way to promote the liquid flow through the orifices and the evaporation of the liquid by situating these orifices of the successive distilling stages at successively lower elevations with the orifices of one stage situated at an elevation lower than the orifices of the preceding stage.

What is claimed is:

1. In an evaporator, elongated, liquid-conveying shell means having a substantially horizontal attitude and having a hollow interior for conveying a liquid in a given direction along said hollow interior of said shell means, a plurality of transverse partition means distributed longitudinally along said shell means and fixed to and extending transversely across said shell means for dividing the latter into a plurality of evaporator stages arranged one after the other in said direction in which liquid is conveyed by said shell means in the hollow interior thereof, each of said partition means being formed with an opening situated at the interior of said shell means and each opening defining an outlet for one stage and an inlet for the next stage, so that each pair of successive partition means define between themselves an evaporator stage having an inlet at an upstream partition means and an outlet at a downstream partition means, and wall means situated in each evaporator stage extending between the upstream and downstream partition means thereof, said wall means having in each evaporator stage a pair of wall portions which are spaced from each other and define between themselves an elongated narrow gap the length of which is substantially greater than the width of said shell means with said gap defining an orifice through which liquid is compelled to flow while travelling from the inlet to the outlet of each stage, said wall means defining with said shell means from said inlet to said gap in each stage an upstream liquid flow path through which liquid is compelled to flow from said inlet to said gap and said wall means providing for said upstream flow path a cross section which decreases as the liquid flows along said upstream flow path in each stage, and said wall means defining between said gap and said outlet of each stage a downstream flow path extending from said gap to said outlet of each stage, and said wall means providing for said downstream flow path in each stage a cross section which increases as the liquid flows along said downstream flow path in each stage from said gap to said outlet thereof, each of said evaporator stages having in its interior a space communicating with the downstream flow path for receiving a vapor in each stage downstream of said gap, condenser means at each evaporator stage communicating with said space thereof for condensing said vapor, and collector means situated beneath said condenser means for collecting distillate resulting from condensation of said vapor by said condenser means, said condenser means being situated at an elevation lower than an upper free surface of liquid flowing along said downstream flow path in each stage, said shell means having an elongated open top extending longitudinally of said shell means, with said shell means otherwise being closed and forming an inner shell means of the evaporator, and said evaporator having an outer shell means surrounding and spaced from said inner shell means and defining therewith said space which communicates through said open top of said inner shell means with liquid at each downstream flow path, said condenser means being situated in said outer shell means beneath said inner shell means, so that vapor flows from said inner shell means through said open top thereof downwardly around opposite sides of said inner shell means along opposed inner side surface regions of said outer shell means to reach said condenser means at opposite sides thereof, while due to centrifugal force droplets of liquid entrained in said vapor will deposit themselves against said inner surface regions of said outer shell means, and a pair of troughs respectively situated along said inner surface regions of said outer shell means while being spaced from said inner shell means and situated at an elevation lower than said open top thereof for collecting said droplets.

2. The combination of claim 1 and wherein said wall means provides in each stage for said gap at least a pair of elongated gap portions each extending longitudinally of said inner shell means and said gap portions respectively facing in opposed lateral directions for directing liquid issuing through one of said gap portions in one lateral direction transversely of said inner shell means and liquid issuing through the other of said gap portions in an opposite lateral direction transversely of said inner shell means.

3. The combination of claim 1 and wherein said inner shell means has a lower wall portion along which the liquid flows in the interior of said inner shell means when travelling beyond said opening in each partition means, and said wall means including a wall extending transversely in the interior of said inner shell means and inclined downwardly from said inlet toward said outlet of each stage with said inclined wall having adjacent the inlet of each stage a higher elevation than adjacent the outlet of each stage, said wall having a lower surface facing said lower wall portion of said inner shell means and defining therewith part of said upstream flow path of decreasing cross section of flow, and said inclined wall of said wall means having at least one side edge spaced from an outer side wall portion of said inner shell means, said wall means including an upright wall extending upwardly from said side edge of said inclined wall and terminating in an upper edge which defines a lower edge of said gap, said wall means including an upper substantially horizontal wall situated over said upper edge of said upright wall and spaced therefrom to define said gap therewith, and the liquid which flows into the space between the lower surface of said inclined wall and said lower wall portion of said inner shell means being compelled to flow upwardly along an outer surface of said upright wall up to said upper horizontal wall of said wall means to then flow through said gap and drop onto an upper surface of said inclined wall, for then flowing along said downstream flow path along said upper surface of said inclined wall toward said outlet of each stage with said inclined wall providing at said downwardly incline upper surface thereof at least part of said downstream flow path of increasing cross section.

4. The combination of claim 1 and wherein said outer shell means has a lower wall portion situated beneath said condenser means and forming said collector means.

5. The combination of claim 1 and wherein said outer shell means is of a generally circular cross section and has inner concave surface portions against which the vapor flows downwardly around said inner shell means toward said condenser means, whereby droplets of liquid entrained with said vapor will deposit themselves against said inner concave surface portions of said outer shell means.

6. The combination of claim 1 and wherein said gap of each evaporator stage except the first of said stages is situated at an elevation lower than the gap of the immediately preceding evaporator stage.

7. The combinatin of claim 1 and wherein said pair of troughs are situated at an elevation lower than said inner shell means.

8. The combination of claim 1 and wherein said inner shell means has an approximately flat lower wall portion.

9. The combination of claim 8 and wherein said approximately flat lower wall portion of said inner shell means has a slightly concave lower surface and a slightly convex upper surface, while said inner shell means has extending upwardly from opposed side edges of said lower wall portion a pair of curved side wall portions which form part of a cylinder and which have inner concave and outer convex surfaces, said outer shell means being of a generally circular cross section and being coaxial with said cylinder.

10. The combination of claim 9 and wherein said outer shell means has a lower wall portion situated beneath said condenser means and forming said collector means.

* * * * *